United States Patent
Ehring et al.

(10) Patent No.: US 6,383,123 B1
(45) Date of Patent: May 7, 2002

(54) APPARATUS FOR TRANSFERRING OBJECTS LYING FLAT ESPECIALLY FOLDED BOXES

(75) Inventors: Rolf Ehring, Winnenden; Willi Krieger, Korb, both of (DE)

(73) Assignee: Robert Bosch GmbH, Stuggart (DE)

( * ) Notice: Subject to any disclaimer, the term of this patent is extended or adjusted under 35 U.S.C. 154(b) by 0 days.

(21) Appl. No.: 09/410,043

(22) Filed: Oct. 1, 1999

(30) Foreign Application Priority Data

Oct. 2, 1998  (DE) .................................... 198 45 384

(51) Int. Cl.⁷ ................................ B31B 1/76
(52) U.S. Cl. ........................ 493/315; 493/52
(58) Field of Search .................. 493/315, 52, 69, 493/316; 53/382.1, 566

(56) References Cited

U.S. PATENT DOCUMENTS

| | | | | |
|---|---|---|---|---|
| 2,987,974 A | * | 6/1961 | Russell | 53/566 |
| 4,596,545 A | * | 6/1986 | Greenwell | 493/315 |
| 4,881,934 A | * | 11/1989 | Harston et al. | 493/315 |
| 4,983,154 A | * | 1/1991 | Nagahashi et al. | 493/315 |
| 5,027,586 A | * | 7/1991 | Ramaker | 53/458 |
| 5,054,761 A | * | 10/1991 | Dietrich et al. | 271/95 |
| 5,061,231 A | * | 10/1991 | Dietrich et al. | 493/315 |
| 5,104,369 A | * | 4/1992 | Calvert | 493/315 |
| 5,215,515 A | * | 6/1993 | Bershadsky | 493/315 |
| 5,562,581 A | * | 10/1996 | Roberto et al. | 493/310 |
| 5,694,745 A | * | 12/1997 | Spatafora et al. | 53/450 |
| 5,715,657 A | * | 2/1998 | Mondani et al. | 53/457 |

FOREIGN PATENT DOCUMENTS

DE  0 434 961 A1  11/1990

* cited by examiner

Primary Examiner—John Paradiso
(74) Attorney, Agent, or Firm—Ronald E. Greigg

(57) ABSTRACT

An apparatus for transferring and erecting folded boxes between a dispensing station and a receiving station of a cardboard box making machine. The apparatus includes a plurality of suction systems with suction heads. The suction heads, which each rotate about a common pivot axis, are each coupled to a separate drive mechanism. The device mechanism varies an angular speed of rotation of the respective suction head on a revolution about the pivot axis, so as to adapt this speed to a particular function required at that time. The apparatus has a high output and makes easy adaptation to various folded boxes possible while simultaneously achieving high functional safety and reliability.

20 Claims, 2 Drawing Sheets

APPARATUS FOR TRANSFERRING OBJECTS LYING FLAT ESPECIALLY FOLDED BOXES

BACKGROUND OF THE INVENTION

The invention relates to an apparatus for transferring objects lying flat, especially folded boxes of the kind known from European Patent Disclosure EP 0 434 961 A1. The known apparatus has a star-shaped, continuously driven rotor with a plurality of suction heads disposed in staggered fashion on the rotor. When a folded box is transferred from a folded box magazine to between the drivers of a continuously driven conveyor chain, the suction head that holds the folded box follows an intrinsically closed cycloidal path, and the folded box, lying flat, is erected between a folded box magazine and the conveyor chain.

A disadvantage of this known apparatus is that because of the cycloidal path, the suction cup on pulling a folded box from the folded box magazine does not execute a solely vertical motion, and on transferring the folded box to between the drivers of the conveyor chain, the box does not execute a forward or horizontal motion that is adapted to the speed of the conveyor chain. As a result of both these factors, the disposition and adaptation of the rotor, folded box magazine and conveyor chain requires relatively major effort, especially for folded boxes whose format and quality of material are critical, if uninterrupted operation of the apparatus is to be possible.

If one seeks to increase the output of the known apparatus, this can be done by increasing the number of suction heads disposed on the rotor, or by increasing the rotary speed (rpm) of the rotor. Increasing the number of suction heads on the rotor entails increased engineering effort and expense, on the one hand, and on the other, is subject to space limitations because of the disposition between the folded box magazine and the conveyor chain. Increasing the rotor rpm is problematic, too, because the load and the forces on the folded box in the erection process can then become excessive.

OBJECT AND SUMMARY OF THE INVENTION

The apparatus according to the invention for transferring objects lying flat, especially folded boxes, as defined herein has the advantage over the prior art that the course of motion of the suction head can be adapted optimally to the particular function required. This means that a folded box blank is being pulled out of the folded box magazine, lateral motion of the suction head relative to the folded box magazine is absent, or virtually absent, as long as the folded box blank is located in the region of the folded box magazine. Furthermore, the transfer of the erected boxes to between the drivers of the conveyor chain is done at a horizontal speed that is adapted to the conveyor chain.

In addition, with the apparatus of the invention, an especially high output can be attained. This is because along the first segment, in which the first folded box lying flat is erected, the folding box blank is conveyed at a speed it can tolerate, and thus the forces acting on the box in the erection process are limited. By comparison, in the second segment, in which the suction head moves from the conveyor chain toward the folded box magazine in order to take up the next folded box blank, the speed of the suction head can be increased. The overall result, compared with known apparatuses, is a higher, variously variable rotary speed of the suction head.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
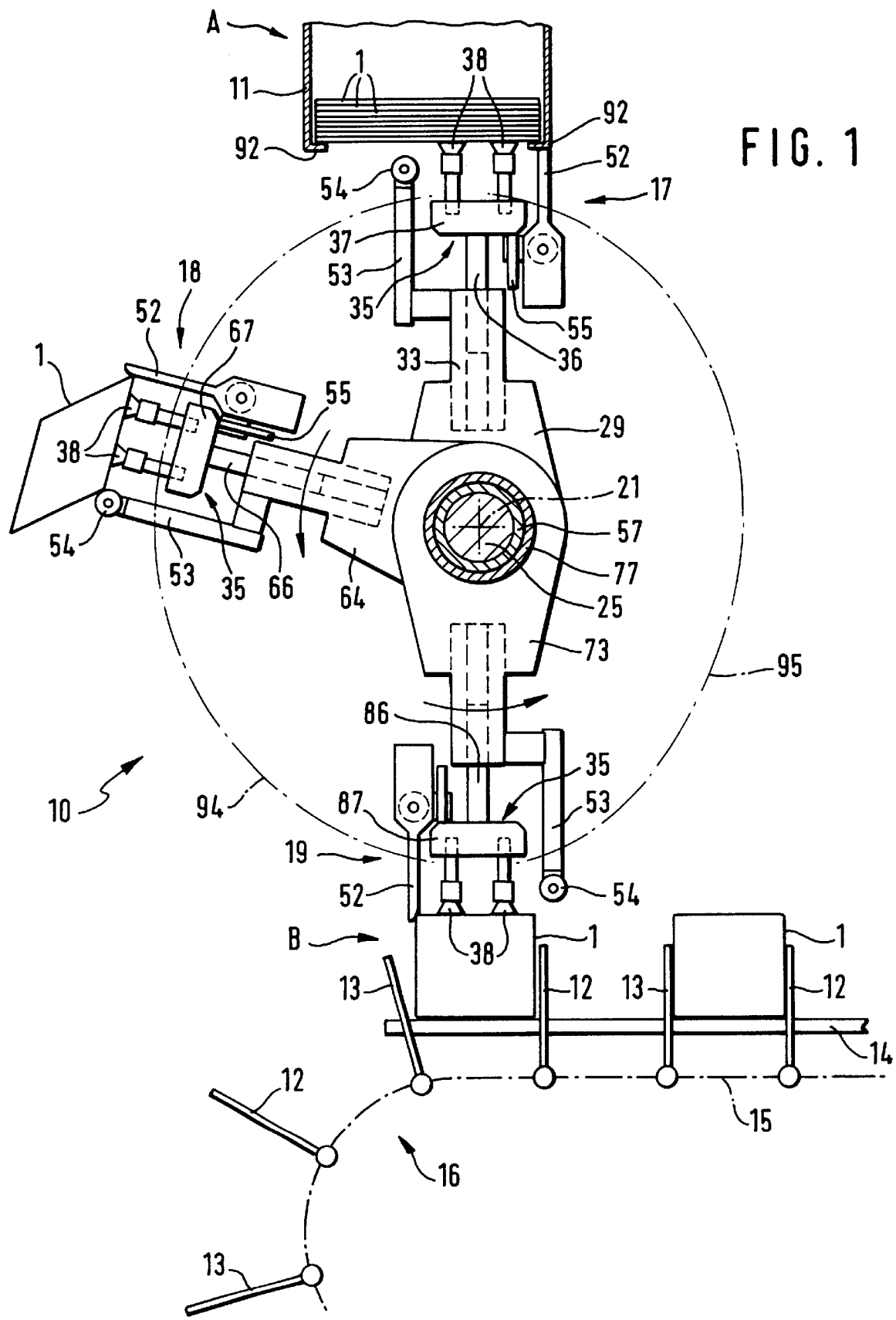
FIG. 1 shows a front view of an apparatus according to the invention, partly in simplified form.
Figure 2:
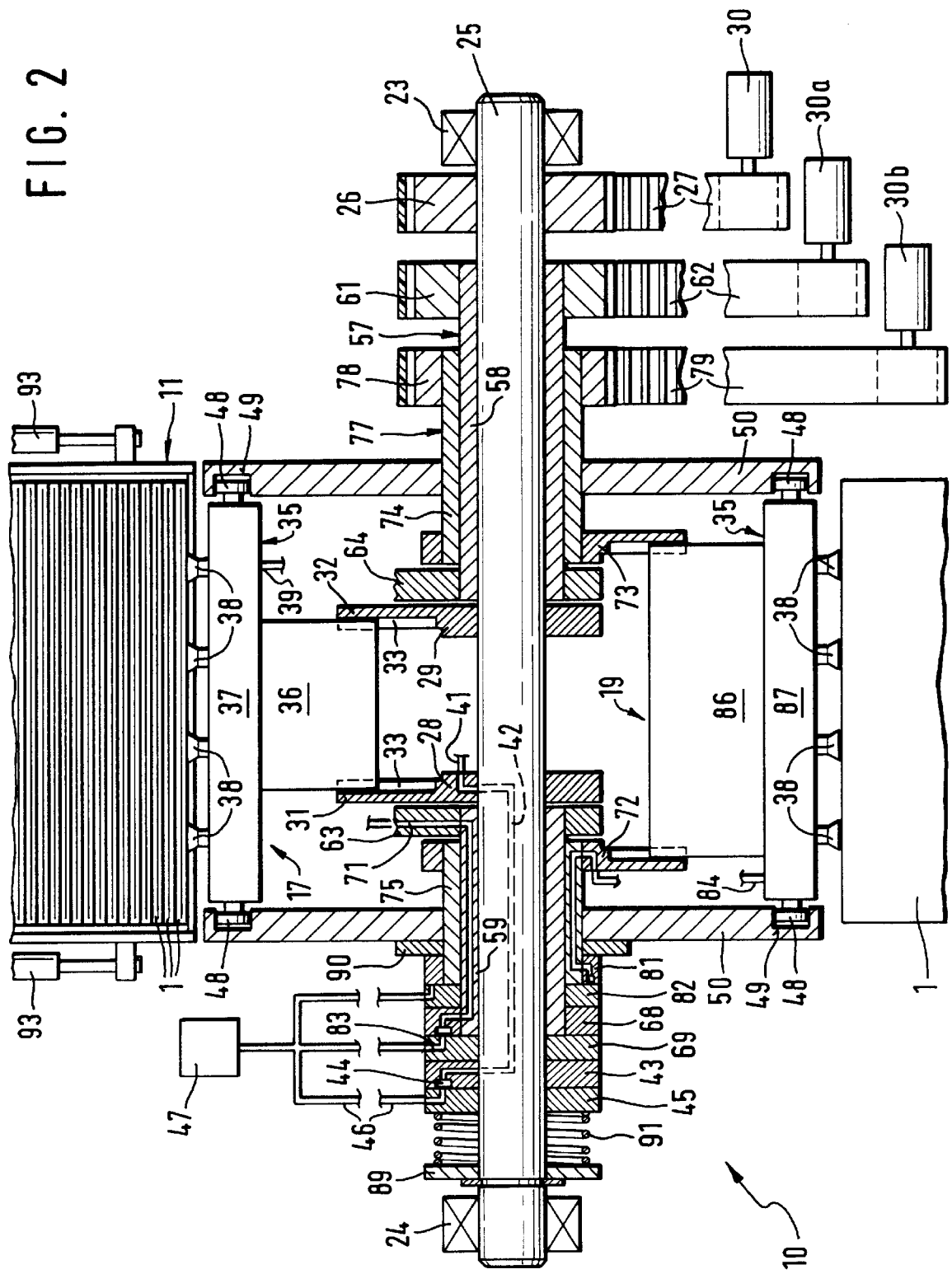
FIG. 2, partly in section, shows a side view of the apparatus of FIG. 1, again partly in simplified form.

The apparatus 10 shown in the drawings is used to take folded boxes 1, lying flat, from a folded box magazine 11 in a dispensing station A and transfer the folded boxes 1, while simultaneously erecting them, to a receiving station B; in the exemplary embodiment they are transferred to between pairs of parallel drivers 12, 13 of a continuously driven conveyor chain 5 of a cardboard box making machine, the drivers 12, 13 being disposed on both sides of a stationary bottom rail 14. To that end, the apparatus 10 disposed between the folded box magazine 11 and a deflection region 16 of the conveyor chain 15 has three suction systems 17, 18, 19, which revolve around a common pivot axis 21.

The first suction system 17 has a shaft 25, guided in two bearings 23, 24, each on one end of the shaft. Near the first bearing 23, a first pulley 26 is connected to the shaft in a manner fixed against relative rotation, and the shaft is connected via a first toothed belt 27 to a first drive mechanism, preferably a servo motor 30. Approximately in the middle of the shaft 25, two delivery devices 28, 29 aligned with one another and spaced apart from one another are likewise connected to the shaft 25 in a manner fixed against relative rotation.

A guide 33 is embodied in each of the end faces, facing toward one another, of the radially protruding arms 31, 32 of the delivery devices 28, 29, and one suction head 35 is disposed radially movably in each guide 33. The suction head 35 has a guide 36 which is displaceable in the guides 33, and a bar-like first suction plate 37 is secured on the side of the guides that faces away from the arms 31, 32. Two rows, in the exemplary embodiment, each with four suction cups 38, are disposed on the side of a first suction plate 37 facing away from the guide 36. A first connection 39 is located on the first suction plate 37 and communicates, via a flexible hose, not shown, with a second connection 41 disposed in the first delivery device 28. Via a conduit 42 formed in the shaft 25, the second connection 41 leads to a first control ring 43 disposed on the shaft 25 in a manner fixed against relative rotation. A suction groove 44 is embodied in the control ring 43, in its face end remote from the first pulley 26, in the angular region between the folded box magazine 11 and the conveyor chain 15. The suction groove 44 is operatively connected to a first, stationary negative pressure ring 45 that rests on the control ring 43. A negative pressure conduit 46 which communicates with a negative pressure source 47 discharges in the negative pressure ring 45, on the side toward the suction groove 44, so that the suction cups are subjected to negative pressure when the negative pressure conduit 46 and the suction groove 44 coincide.

In order to generate the aforementioned radial motion of the suction head 35, one guide roller 48 is disposed on each of the two lateral end faces of the first suction plate 37. The guide rollers 48 roll along guide paths 49 of two stationary guide plates 50, which are disposed on both sides of the delivery devices 28, 29.

For erecting a folded box 1 along the transfer route from the folded box magazine 11 to the conveyor chain 15, a cardboard box bracing means 52 and erection prongs 53, which are disposed on the broad sides of the first suction plate 37, are associated with the suction head 35. The erection prongs 53 are secured in stationary fashion to one of the two arms 31, 32 of the delivery devices 28, 29 and each has one roller 54 on one of its ends. By comparison, the cardboard box bracing means 52 is disposed pivotably, via a lever mechanism, not shown, on an extension 55 secured to the guide 36 and penetrates the folded box magazine 11, inside a suitably embodied recess.

The second and third suction systems 18 and 19 are constructed similarly to the first suction system 17. In particular, they too have radially movable suction heads 35 with suction cups 38, which are guided by guide rollers 48 in the guide paths 49 of the guide plates 50.

The drive of the second suction system 18 is effected by means of a first, split hollow shaft 57 that has two portions 58, 59; a second pulley 61 parallel to the first pulley 26 is disposed on the first portion 58 in a manner fixed against relative rotation. The second pulley 61 is in turn coupled via a second toothed belt 62 to a separate drive mechanism, preferably a servo motor 30b.

The two portions 58, 59 of the first hollow shaft 47 each extend to the two respective delivery devices 28, 29 secured to the shaft 25, where the two delivery devices 63, 64 for the suction head 35 of the second suction system 18 are disposed in a manner fixed against relative rotation on the portions 58, 59. The guide 66 together with the second suction plate 67 is guided radially movably in the two delivery devices 63, 64. A second control ring 68 is secured to the portion 59 on the side opposite the first delivery device 63. The second control ring 68 cooperates with a second negative pressure ring 69, which is slipped onto the shaft 25 and is disposed between the two control rings 43, 68.

A connection 71 that connects the negative pressure source 47 with the suction cups 38 of the second suction system 18 and subjects them to negative pressure in accordance with the angular position of the suction head 35 is embodied in the delivery device 63, the portion 59 of the hollow shaft 57, the control ring 68 and the negative pressure ring 69.

The delivery devices 72, 72 of the third suction system 19 that embrace the delivery devices 63, 64 of the second suction system 18 are secured in a manner fixed against relative rotation to portions 74, 75 of a second hollow shaft 77, which in turn surrounds part of the first hollow shaft 57. A third pulley 78 is secured to the portion 74 and is driven via a third toothed belt 79 by a third separate drive mechanism, again preferably a servo motor 30b. On the end of the portion 75 opposite the delivery device 72, there is a third control ring 81, which cooperates with a third negative pressure ring 82 disposed between the second control ring 68 and the end of the portion 75. A connection 83 that communicates with the negative pressure source 47 is embodied in the negative pressure ring 82, control ring 81, portion 75, and delivery device 72. Because of the angular position of the suction head 35 of the third suction system 19, however, only the portion of the connection 83 that is formed in the third negative pressure ring 82 is visible in the drawing. From the delivery device 72, the connection 83 leads by means of an elastic hose 84 to the third suction plate 87 communicating with the guide 86.

To prevent or reduce air leakage losses between the control rings 43, 68, 81 and negative pressure rings 45, 69, 82 abutting one another, the control rings 43, 68, 81 and the negative pressure rings 45, 69, 82 are disposed between two spacer rings 89, 90, between which there is also a compression spring 91, which presses the control rings 43, 68, 81 and the negative pressure rings 45, 69, 82 against one another.

As mentioned, the radial displaceability of the suction systems 17–19, or of their suction heads 35, is effected by the guide plates 50 with the guide paths 49 formed in them and the guide rollers 48 rolling in these paths. For pulling one folded box 1, lying flat, from the folded box magazine 11, the suction cup 38 of the applicable suction system 17–19 must dip briefly into the lower opening cross section of the folded box magazine 11, which is open except for the retaining lugs 92 for the folded boxes 1. This relative motion between the suction cup 38 and the folded box magazine 11 would, if a horizontal motion between the folded box magazine 11 and the applicable folded box 1 as it is being taken out is to be largely avoided, make the guide paths 49 of the guide plates 50 quite steep and hence would put a major load on the drive mechanism in question. For this reason, and because a horizontal motion between the particular folded box 1 and the folded box magazine 11 as the box is being taken but can be averted entirely, it is preferably provided that the folded box magazine 11 also be movable. This is accomplished by means of two lifting cylinders 93, secured to the housing of the folded box magazine 11. For taking a folded box 1 out while it lies flat, the lifting cylinders 93 move the folded box magazine 11 first in the direction of the suction cups 38, putting the suction cup into contact with one side of the folded box 1, and then in the opposite direction, so that the folded box 1 overcomes the retaining lugs 92. It is understood that instead of lifting cylinders 93, other means capable of effecting a relative motion of the folded box magazine 11 to the suction cups 38 are also conceivable.

The apparatus 10 described above functions as follows:

The three suction systems 17–19 are each rotated counterclockwise by their own drive mechanism via the toothed belts 27, 62 and 79. It is understood that an angular spacing between the suction systems 17–19 such that they do not touch one another is provided. For pulling a folded box 1, lying flat, out of the folded box magazine 11, the applicable suction system 17–19 is stopped underneath the folded box magazine 11. In this position, the suction cups 38 are radially spaced apart from the pivot axis 21 far enough that the roller 54 of the erection prong 53, the prong being stationary relative to the pivot axis 21, is located below the level of the suction cups 38.

The folded box magazine 11 is now lowered far enough by the lifting cylinders 93 that the suction cups 38 subjected to negative pressure come into contact with one side of the folded box 1. Once the folded box magazine 11 has been lifted again by the lifting cylinders 93, the folded box 1 is free. After that the applicable suction system 17–10 is rotated in the direction of the drivers 12, 13 of the conveyor chain 15 along a first path segment 94, which covers 180°. Along this path segment 94, the spacing of the suction cups 38 from the pivot axis 21 initially decreases because of the correspondingly embodied guide paths 49, so that once the cardboard box bracing means 52 has been pivoted into contact with the folded box 1, the folded box 1 can be erected by the erection prongs 53, whose roller 54 presses against one side wall of the folded box 1 (FIG. 1, suction system 18). After that, the spacing of the suction cups 38 from the pivot axis 21 increases again, in order not to come into contact with the drivers 12, 13 of the conveyor chain 15 when the erected folded box 1 is introduced between the drivers 12, 13. The angular speed of the suction system 17–19 along the first path segment 94 depends on the format and the quality of material of the folded box 1 and should be selected to be high enough, for the sake of high output of the apparatus 10, that the folded box 1 can still be reliably opened and erected without experiencing an excessive load on its side walls.

For introducing the folded box 1 into the conveyor chain 15, it is essential that the applicable suction system 17–19 be adapted in its angular speed by its associated drive mechanism in such a way that the transfer of the folded box 1 occurs at a horizontal speed that is at least nearly the same as the conveying speed of the continuously driven conveyor chain 15. Additionally, because the folded box 1 is introduced in the deflection region 16 of the conveyor chain 15, the trailing driver 13 of a pair of drivers associated with a folded box 1 is also positioned obliquely, which makes the introduction possible.

From the moment when the folded box 1 is placed between the drivers 12, 14 of the conveyor chain 15, the suction cups 38 are no longer subjected to negative pressure, and thus the folded box 1 is now fed onward along the bottom rail 14 solely by the conveyor chain 15. After that the suction cups 38 are returned to where they were, and the cardboard box bracing means 52 is pivoted out of the way via the lever mechanism.

For the sake of achieving high output of the apparatus 10, the applicable suction system 17–19 is now rotated onward counterclockwise in the shortest possible time, that is, at the highest possible angular speed, over its second path segment 95, again covering 180°, so that the next folded box 1 can be taken out of the folded box magazine 11. The angular speed of the suction system 17–19 along the second path segment 96 is limited then only by the mechanical load-bearing capacity of the apparatus 10 and in particular of its drive components, but not by the properties of the folded box 1.

To supplement the above-described exemplary embodiment, it is naturally also conceivable for the conveyor chain 15 to be driven intermittently, instead of continuously. In that case, the applicable suction system 17–19 stops, in the stopped phase of the conveyor chain 15, to transfer a folded box 1 to between the drivers 12, 13.

In addition, the output of the apparatus 10 can also be adapted to a given intended use by varying the number of suction systems 17–19. The number of suction systems 17–19 is then limited only by the complication and hence cost of the apparatus, and by the space needed for the suction systems 17–19, but if only a low output is needed it can even be reduced to a single suction head 35 or a single suction system.

The foregoing relates to a preferred exemplary embodiment of the invention, it being understood that other variants and embodiments thereof are possible within the spirit and scope of the invention, the latter being defined by the appended claims.

We claim:

1. An apparatus (10) for transferring objects lying flat, in particular folded boxes (1), from a dispensing station (A) to a receiving station (B), comprising more than one suction head (35) revolving along a closed path (94, 95) about a pivot axis (21), a separate drive mechanism (30, 30a, 30b) assigned to each suction head (35), and that the angular speed of rotation of each suction head (35) in its revolution about the pivot axis (21) is variable with respect to the other suction heads.

2. The apparatus according to claim 1, in which each suction head (35) is disposed radially movably on a separate delivery device (28, 29; 63, 64; 72, 73), and each delivery device is secured in a manner fixed against relative rotation on a separate shaft (25, 57, 77), each shaft being driven by one of the drive mechanisms (30, 30a, 30b), and that at least one guide element (48) that cooperates with a guide (50) is secured to each suction head (5).

3. The apparatus according to claim 2, in which the shafts (25, 57, 77) are disposed coaxially to one another.

4. The apparatus according to claim 3, in which each suction head (35) is secured to two delivery devices (28, 29; 63, 64; 72, 73), and that the delivery devices (28, 29; 63, 64; 72, 73) assigned to a respective suction head (35) include, or are disposed inside, the delivery devices (28, 29; 63, 64; 72, 73) of another suction head (35).

5. The apparatus according to claim 4, in which a ring (43, 68, 81) is disposed on each shaft (25, 57, 77) in a manner fixed against relative rotation, and a conduit (44) is embodied in the ring and cooperates with a second ring (45, 69, 82) that communicates with a negative pressure source (47), so that depending on the angular position of the suction head (35), said suction cups (38) are subjected to negative pressure.

6. The apparatus according to claim 5, in which transfer elements (26, 61, 78) for the drive mechanisms (30, 30a, 30b) are each disposed on one end of the shafts (25, 57, 77), and the rings (43, 45; 68, 69; 81, 82) for controlling the negative pressure are each disposed on another end of the shafts (25, 57, 77), and the delivery devices (28, 29; 63, 64; 72, 73) of the suction heads (35) are located between their respective transfer elements (26, 61, 78) and their respective pressure controlling rings (43, 45; 68, 69; 81, 82).

7. The apparatus according to claim 4, in which for transferring a folded box (1) from the dispensing station (A) to each suction head (35), the dispensing station (A) is movable relative to the suction head (35).

8. The apparatus according to claim 4, in which one stationary erecting element (53) is assigned to each suction head (35) and erects the folded box (1) upon the radial motion of the suction head (35).

9. The apparatus according to claim 3, in which a ring (43, 68, 81) is disposed on each shaft (25, 57, 77) in a manner fixed against relative rotation, and a conduit (44) is embodied in the ring and cooperates with a second ring (45, 69, 82) that communicates with a negative pressure source (47), so that depending on the angular position of the suction head (35), said suction cups (38) are subjected to negative pressure.

10. The apparatus according to claim 9, in which transfer elements (26, 61, 78) for the drive mechanisms (30, 30a, 30b) are each disposed on one end of the shafts (25, 57, 77), and the rings (43, 45; 68, 69; 81, 82) for controlling the negative pressure are each disposed on another end of the shafts (25, 57, 77), and the delivery devices (28, 29; 63, 64; 72, 73) of the suction heads (35) are located between their respective transfer elements (26, 61, 78) and their respective pressure controlling rings (43, 45; 68, 69; 81, 82).

11. The apparatus according to claim 3, in which for transferring a folded box (1) from the dispensing station (A) to each suction head (35), the dispensing station (A) is movable relative to the suction head (35).

12. The apparatus according to claim 3, in which one stationary erecting element (53) is assigned to each suction head (35) and erects the folded box (1) upon the radial motion of the suction head (35).

13. The apparatus according to claim 2, in which a ring (43, 68, 81) is disposed on each shaft (25, 57, 77) in a manner fixed against relative rotation, and a conduit (44) is embodied in the ring and cooperates with a second ring (45, 69, 82) that communicates with a negative pressure source (47), so that depending on the angular position of the suction head (35), said suction cups (38) are subjected to negative pressure.

14. The apparatus according to claim 13, in which transfer elements (26, 61, 78) for the drive mechanisms (30, 30*a*, 30*b*) are each disposed on one end of the shafts (25, 57, 77), and the rings (43, 45; 68, 69; 81, 82) for controlling the negative pressure are each disposed on another end of the shafts (25, 57, 77), and the delivery devices (28, 29; 63, 64; 72, 73) of the suction heads (35) are located between their respective transfer elements (26, 61, 78) and their respective pressure controlling rings (43, 45; 68, 69; 81, 82).

15. The apparatus according to claim 13, in which for transferring a folded box (1) from the dispensing station (A) to each suction head (35), the dispensing station (A) is movable relative to the suction head (35).

16. The apparatus according to claim 13, in which one stationary erecting element (53) is assigned to each suction head (35) and erects the folded box (1) upon the radial motion of the suction head (35).

17. The apparatus according to claim 2, in which for transferring a folded box (1) from the dispensing station (A) to the suction head (35), the dispensing station (A) is movable relative to the suction head (35).

18. The apparatus according to claim 2, in which one stationary erecting element (53) is assigned to each suction head (35) and erects the folded box (1) upon the radial motion of the suction head (35).

19. The apparatus according to claim 1, in which for transferring a folded box (1) from the dispensing station (A) to the suction head (35), the dispensing station (A) is movable relative to the suction head (35).

20. The apparatus according to claim 1, in which each of the drive mechanisms are servo motors (30, 30*a*, 30*b*).

\* \* \* \* \*